United States Patent
Small et al.

(10) Patent No.: US 10,522,045 B2
(45) Date of Patent: *Dec. 31, 2019

(54) FLIGHT SCHEDULE DISRUPTION AWARENESS SYSTEMS AND METHODS

(71) Applicant: THE BOEING COMPANY, Chicago, IL (US)

(72) Inventors: Gregory John Small, Federal Way, WA (US); Goran Stojkovic, Aurora, CO (US); Frank R. Morales, Montreal (CA); Peter Douglas Cornett, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,805

(22) Filed: Aug. 2, 2018

(65) Prior Publication Data

US 2019/0080615 A1    Mar. 14, 2019

Related U.S. Application Data

(63) Continuation-in-part of application No. 15/703,053, filed on Sep. 13, 2017.

(51) Int. Cl.
*G08G 5/00* (2006.01)
*G06Q 50/30* (2012.01)
*G06Q 10/06* (2012.01)

(52) U.S. Cl.
CPC ....... *G08G 5/003* (2013.01); *G06Q 10/06312* (2013.01); *G06Q 50/30* (2013.01); *G08G 5/0043* (2013.01); *G08G 5/0082* (2013.01)

(58) Field of Classification Search
CPC .. G08G 5/0026; G08G 5/0013; G08G 5/0021; G08G 5/0039; G08G 5/0043; G08G 5/003; G08G 5/0034; G06Q 10/06312; G06Q 10/0631; G06Q 50/30; G06Q 10/00;
(Continued)

(56) References Cited

U.S. PATENT DOCUMENTS

| | | | |
|---|---|---|---|
| 7,747,382 B2 | 6/2010 | Small | |
| 8,694,184 B1* | 4/2014 | Boorman | G01C 23/00 340/945 |
| 9,862,501 B2* | 1/2018 | Small | G06Q 10/00 |

(Continued)

OTHER PUBLICATIONS

Wiesemann et al., An integrated operations solution for gate-to-gate airline operations, 2011, IEEE, p. 1-12 (Year: 2011).*

*Primary Examiner* — Mcdieunel Marc
(74) *Attorney, Agent, or Firm* — Joseph M Butscher; The Small Patent Law Group, LLC

(57) ABSTRACT

A flight schedule disruption awareness system and method is configured to provide situational awareness of flight disruptions that affect a flight schedule for a plurality of flights. The flight schedule disruption awareness system includes a disruption determination control unit that is configured to receive a plurality of flight schedule update inputs related to flight schedule updates to the flight schedule. The disruption determination control unit determines a root cause flight disruption from the plurality of flight schedule update inputs. The root cause flight disruption affects flights of a plurality of aircraft.

20 Claims, 8 Drawing Sheets

(58) Field of Classification Search
CPC ...... G06Q 10/06; G06Q 10/02; G06Q 10/025; G01C 23/00
See application file for complete search history.

(56) References Cited

U.S. PATENT DOCUMENTS

| | | | | |
|---|---|---|---|---|
| 2004/0039614 | A1* | 2/2004 | Maycotte | G06Q 10/02 705/5 |
| 2005/0165628 | A1* | 7/2005 | Vaaben | G06Q 10/02 705/5 |
| 2008/0010004 | A1* | 1/2008 | Small | G08G 5/00 701/120 |
| 2008/0010005 | A1* | 1/2008 | Small | G08G 5/00 701/120 |
| 2008/0010107 | A1* | 1/2008 | Small | G06Q 10/06 705/1.1 |
| 2008/0046167 | A1* | 2/2008 | Small | G06Q 10/00 701/120 |
| 2012/0218127 | A1* | 8/2012 | Kroen | G08G 5/0034 340/945 |
| 2016/0093218 | A1* | 3/2016 | Hale | G08G 5/003 701/120 |
| 2016/0093219 | A1* | 3/2016 | Bailey | G08G 5/0013 701/120 |
| 2016/0093221 | A1* | 3/2016 | Bailey | G08G 5/0039 701/120 |
| 2016/0093222 | A1* | 3/2016 | Hale | G08G 5/0039 701/120 |
| 2018/0012152 | A1* | 1/2018 | Arguello | G06Q 10/025 |
| 2019/0080615 | A1* | 3/2019 | Small | G08G 5/003 |

\* cited by examiner

FLIGHT SCHEDULE DISRUPTION AWARENESS SYSTEMS AND METHODS

RELATED APPLICATIONS

This application is a continuation-in-part of U.S. patent application Ser. No. 15/703,053, entitled "Flight Schedule Disruption Awareness Systems and Methods," filed Sep. 13, 2017, which is hereby incorporated by reference in its entirety.

FIELD OF THE DISCLOSURE

Embodiments of the present disclosure generally relate to systems and methods for improving situational awareness of flight operations disruptions that affect a flight schedule, and, more particularly, to systems and methods for identifying events that are root causes of potential flight schedule disruptions.

BACKGROUND OF THE DISCLOSURE

Aircraft are used to transport passengers and cargo between various locations. Numerous aircraft depart from and arrive at a typical airport every day.

An integrated set of flight operations schedules set departure times and arrival times for flights between airports. For various reasons, however, disruptions affect anticipated arrival and/or departure times for flights. For example, incoming and departing flights may be delayed due to inclement weather. As another example, a flight may be delayed due to a crew delay, such as may be caused by a scheduled flight crew for one particular flight being delayed on a leg of a previous flight. As another example, a departing flight may be delayed due to maintenance issues.

Schedule delays may or may not cause a flight disruption. For example, a four-hour maintenance delay will fit within a maintenance window when a next scheduled departure time for a flight is scheduled to depart eight hours after the original maintenance event. As such, the delay is not considered a flight disruption. A flight operation delay is disruptive if it affects a scheduled arrival or departure time for one or more flights in excess of a disruption threshold limit. As an example, a crew delay of an hour may cause a flight disruption in that it delays a scheduled departure of a flight by a particular amount of time (such as a flight delay of half an hour) that is beyond the disruption threshold limit (such as twelve minutes).

Certain airline and military operators have processes that build substantially-optimized schedules for their aircraft fleets, maintenance, airport gates, and crews. The operational goal is to stay on a particular schedule. As can be appreciated, various events may disrupt the operational goal. Examples of the disrupting events include inclement weather, crew illness, aircraft maintenance issues, crew work schedule rules and requirements, and the like. When a disruption occurs, an operations center attempts to contain the effect of the impact to a single flight by looking at solutions that balance economics, regulatory constraints, and contractual constraints with impacts to customers, cargo, and later flights, for example. As such, operations personnel typically ascertain the impact of the disruption if nothing is done in relation to a schedule recovery plan.

Typically, one or more individuals at an operations center (such as airline operations personnel) analyze numerous delays to determine whether or not such delays cause flight disruptions. Accordingly, the individual(s) typically analyzes a delay(s) to determine how the delay(s) affects scheduled flight times. For example, a flight arrival delay of thirty minutes for a particular flight may or may not cause a disruption to any other flights. In order to determine whether the flight arrival delay causes a disruption to another flight, the individual(s) at the operations center analyzes the flight arrival delay in relation to one or more other scheduled flights. The analysis includes all the scheduled resources for the delayed flight (such as the particular aircraft, flight and cabin crew, maintenance, passenger connections, airport catering, fuel, lavatory, baggage gate, slot time, cargo, etc.), as well as for the next use of each of those resources.

As can be appreciated, such complex disruption assessments may not be able to be conducted within a reasonable time to implement sufficient recovery action. That is, the analysis is typically labor intensive, and may take a relatively long period of time, thereby reducing a possibility for an alternate plan that could otherwise alleviate the disruption. There may be limited time available to implement a recovery action, and there may be multiple delays to be analyzed separately and/or together.

Moreover, by the time a determination is made, another delay may have occurred that negates the original analysis. In short, delays cannot be analyzed in isolation. Rather, the set of all active delays are continually analyzed by one or more individuals at a flight operations center, thereby yielding a complex, complicated, and time- and labor-intensive process.

SUMMARY OF THE DISCLOSURE

A need exists for a system and method of improving situational awareness of flight disruptions (for example, flight operations schedule disruptions). Further, a need exists for a system and method of identifying multiple elements that may impact or cause flight disruptions in order to allow for quick and efficient decisions by operations staff.

With those needs in mind, certain embodiments of the present disclosure provide a flight schedule disruption awareness system that is configured to provide situational awareness of flight disruptions that affect a flight schedule for a plurality of flights. The flight schedule disruption awareness system includes a disruption determination control unit that is configured to receive a plurality of flight schedule update inputs related to flight schedule updates to the flight schedule. The disruption determination control unit determines a root cause flight disruption from the plurality of flight schedule update inputs. The root cause flight disruption affects flights of a plurality of aircraft.

In at least one embodiment, the flight schedule disruption awareness system also includes a display in communication with the disruption determination control unit. The disruption determination control unit is configured to show the root cause flight disruption on the display. The disruption determination control unit may indicate the root cause flight disruption on the display via particular, conspicuous root cause indicia.

In at least one embodiment, the disruption determination control unit is configured to show other disruptions to the flights of the plurality of aircraft caused by the root cause flight disruption. The disruption determination control unit may link the other disruptions to the root cause flight disruption. The disruption determination control unit may indicate the other disruptions on the display via caused-disruption indicia.

The disruption determination control unit may be configured to show a portion of the flight schedule on the display.

The disruption determination control unit may be configured to show the root cause flight disruption on the portion of the flight schedule. The disruption determination control unit may be configured to show other disruptions to the flights of the plurality of aircraft caused by the root cause flight disruption on the portion of the flight schedule.

The disruption determination control unit may be configured to show a disruption indicator in relation to an aircraft on the display. The disruption indicator indicates that the root cause flight disruption occurs during a leg of the aircraft.

The disruption determination control unit may be configured to show a monetary impact indicator of the root cause flight disruption on the display.

In at least one embodiment, the disruption determination control unit may only show the root cause flight disruption and other disruptions caused by the root cause flight disruption on the display without showing legs of flights that are not disrupted.

The disruption determination control unit may be configured to show the root cause flight disruption on the display in relation to an aircraft, leg, and disruptive event on the display. The disruption determination control unit may be configured to show individuals affected by the disruptive event on the display.

In at least one embodiment, the disruption determination control unit is configured to show schedule slack indicators on the display.

Certain embodiments of the present disclosure provide a flight schedule disruption awareness method that is configured to provide situational awareness of flight disruptions that affect a flight schedule for a plurality of flights. The flight schedule disruption awareness method includes receiving, by a disruption determination control unit, a plurality of flight schedule update inputs related to flight schedule updates to the flight schedule, and determining, by the disruption determination control unit, a root cause flight disruption from the plurality of flight schedule update inputs. The root cause flight disruption may affect one or more flights of a plurality of aircraft.

In at least one embodiment, the method also includes showing the root cause flight disruption on a display that is in communication with the disruption determination control unit. The showing may include indicating the root cause flight disruption on the display via a particular, conspicuous root cause indicia, and showing other disruptions to the flights of the plurality of aircraft caused by the root cause flight disruption. The showing other disruptions may include indicating the other disruptions on the display via caused-disruption indicia. The method may also include linking the other disruptions to the root cause flight disruption.

The method may also include showing a disruption indicator in relation to an aircraft on the display (wherein the disruption indicator indicates that the root cause flight disruption occurs during a leg of the aircraft), showing a monetary impact indicator of the root cause flight disruption on the display, and/or showing schedule slack indicators on the display.

DETAILED DESCRIPTION OF THE DISCLOSURE

Figure 1:
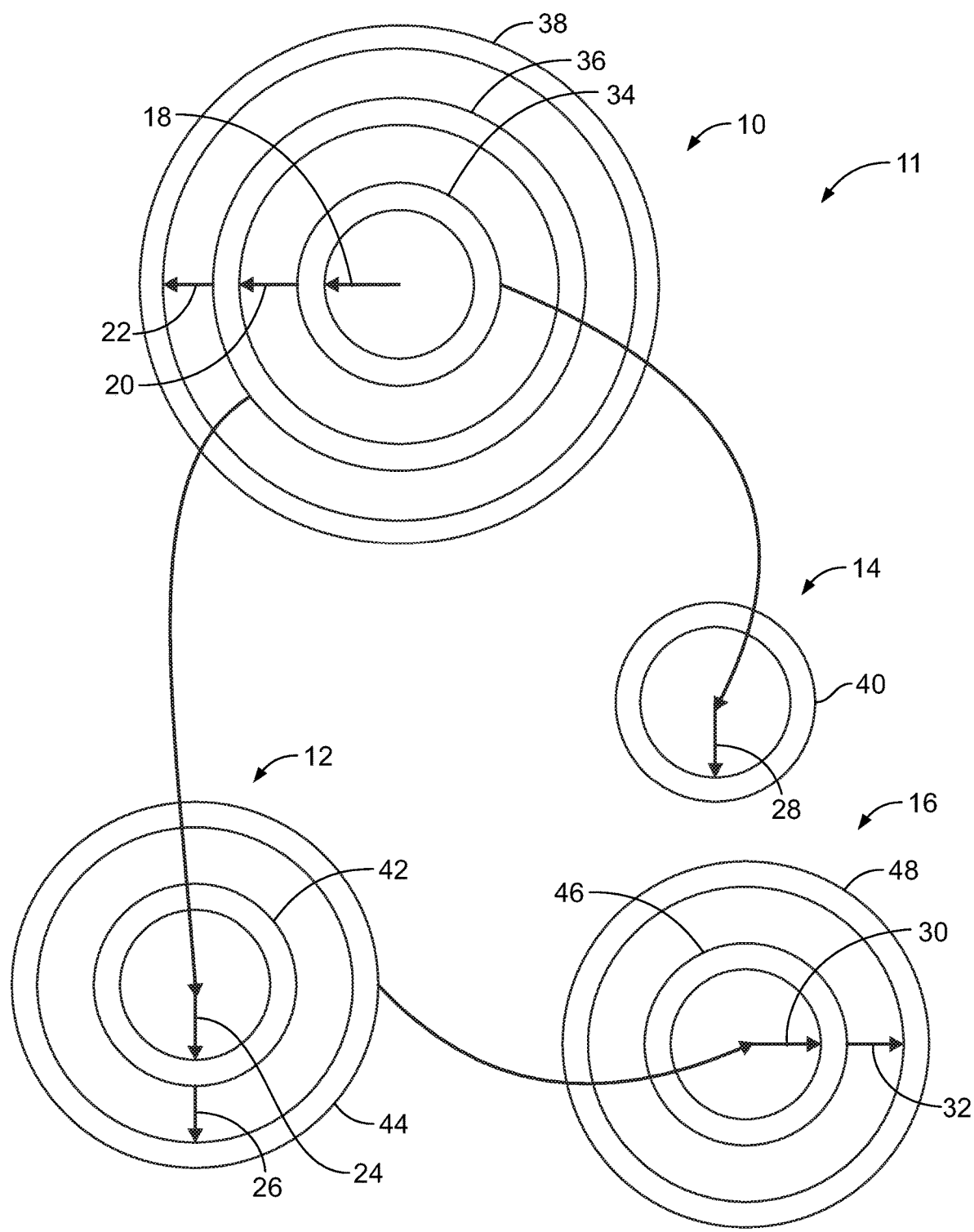
FIG. 1 is a simplified schematic diagram of flight disruptions for a plurality of aircraft.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide systems and methods that identify and display events that are root causes of potential flight schedule disruptions. The systems and methods identify events that are likely to reduce an impact of a disruption. The systems and methods are configured to display impactful disruptions. The systems and methods evaluate the impact of a disruption though an operational environment.

The embodiments of the present disclosure provide an improved process that focuses situational awareness and decision making on disruptions that have an impact on a flight schedule. The systems and methods are configured to detect all disruptions, and measure their effect on the flight schedule based on established business rules. In at least one embodiment, a disruption effect network is presented graphically (a subset of the overall flight network for the day-of-operation) to provide real-time situational awareness to airline operations staff and management for operations resources that are affected. Embodiments of the present disclosure improve airline operational effectiveness by analyzing multiple potential disruptive events and, in at least one embodiment, presenting information about events that actually disrupt flight schedules, and a potential impact of solutions in the context of an operating environment.

Certain embodiments of the present disclosure provide a day-of-operations method and system to determine and display a set of airline operational schedule impacts for a disruption. The method and system are configured to determine which disruptions result in a schedule impact (reducing operational distractions), and identify the type and duration of the schedule impact by recursively assessing the resources (for example, passengers, aircraft, cabin and cockpit crewmembers, and maintenance) and airport (gate, catering, fuel, baggage, lavatory and cargo, etc.) associated with the affected flight(s). The systems and method allow day-of-operations management to have immediate visibility to an impact on a schedule. Estimated schedule impact related costs and lost value of the disruption are presented.

As used herein, an aircraft may be any fixed- or rotary-winged vehicle capable of flight, and being piloted, remotely piloted or operating autonomously, for example. As used herein, an airport is any location where an aircraft is capable of landing, such as a commercial or military airport or helipad, private or public airstrip, ship, field, park, driveway, or the like. As used herein, a delay is any actual or predicted, positive or negative deviation in time from the current schedule. As used herein, a disruption is any delay that exceeds a specified threshold value (for example, a crew disruption may have a different threshold value than a maintenance disruption).

FIG. 1 illustrates a simplified schematic diagram of flight disruptions within a flight schedule 11 that affects a plurality of aircraft 10, 12, 14, and 16 (that is, affects scheduled flights of the plurality of the aircraft 10, 12, 14, and 16). Each aircraft 10, 12, 14, and 16 may be scheduled to fly one or more segments or legs (that is, scheduled flights between particular locations). The aircraft 10, 12, 14, and 16 are scheduled for flights that may be broken into several segments or legs representing stops or connections at airports. An aircraft departing from an originating airport may have one or more intervening airports before the aircraft reaches its final destination airport. For example, the aircraft 10 is scheduled for fly a first leg 18 from a first departure location to a first arrival location, a second leg 20 from a second departure location (the same as the first arrival location) to a second arrival location, and a third leg 22 from a third departure location (the same as the second arrival location) to a third arrival location.

The aircraft 12 is scheduled to fly a first leg 24 between locations, and a second leg 26 between locations. The aircraft 14 is scheduled to fly a first leg 28 between locations. The aircraft 16 is scheduled to fly a first leg 30 between locations, and a second leg 32 between locations. The schedule 11 may include more or less aircraft than shown. Further, each aircraft 10, 12, 14, and 16 may be scheduled to fly more or less legs than shown.

At each leg, a disruption (represents by rings, e.g., 34, 36, or 38) may occur. The disruption may occur for various reasons. For example, the disruption may be due to a late departure and/or arrival, maintenance issues for a particular aircraft, crew work rules and regulations that prevent a particular crew from flying a subsequent leg (and therefore requiring a new crew for that particular leg), crew unavailability, delayed connecting passengers, and/or the like. A disruption in one leg of an aircraft may ripple throughout the schedule 11 and cause disruptions in other legs of other flights.

As an example, a disruption 34 in the first leg 18 of the aircraft 10 may cause a disruption 36 in the second leg 20 of the aircraft 10. As shown, the disruption 34 extends a total time of the first leg 18. Further, the disruption 36 may cause a further disruption 38 in the third leg 22 of the aircraft 10. Each disruption 34, 36, and 38 may cause a delay for a particular leg 18, 20, and/or 22. Additionally, the disruption 34 in the first leg 18 of the aircraft 10 may cause a disruption 40 in the leg 28 of the aircraft 14. As such, the disruption 34 not only affects the aircraft 10, but also ripples to affect the aircraft 14. While shown at the end of the initially-planned first leg 18, it is understood that the disruption 34 may occur before or during the initially-planned first leg 18.

Similarly, the disruption 36 in the second leg 20 ripples out to affect the first leg 24 of the aircraft 12. As such, the disruption 36 causes a subsequent disruption 42 in the first leg 24 of the aircraft 12. Consequently, the disruption 42 causes a subsequent disruption 44 in the second leg 26 of the aircraft 12. Therefore, the initial disruption 34 of the first leg 18 of the aircraft 10 not only causes the disruption 40 in a leg 28 of the aircraft 14, but also causes a ripple effect that causes the disruption 36 in the second leg 20 of the aircraft 10, which, in turn, causes the disruption 42 in the first leg 24 of the aircraft 12, which, in turn, causes the disruption 44 in the second leg 26 of the aircraft 12.

Further, the disruption 44 in the second leg 26 of the aircraft 12 in turn causes a disruption 46 in the first leg 30 of the aircraft 16. The disruption 46 causes a subsequent disruption 48 in the second leg 32 of the aircraft 16. Therefore, the disruption 34 of the aircraft 10 is a root cause for the disruptions 36 and 38 of the aircraft 10, as well as the disruption 40 of the aircraft 14, the disruptions 42 and 44 of the aircraft 12, and the disruptions 46 and 48 of the aircraft 16. The initial disruption 34 of the aircraft 10 ripples throughout the schedule 11, causing subsequent disruptions for the other aircraft 12, 14, and 16. Determining the initial disruption 34 as the root cause of the subsequent disruptions allows an operational staff to avoid, alleviate, or otherwise reduce the disruption (such as through use of another aircraft, crew, or the like), and, as such, alleviate, avoid, or otherwise reduce further disruptions.

Embodiments of the present disclosure provide systems and methods for identifying the disruption 34 as the initial or root cause or root event. The disruption 34 may be assigned an event identifier, which may be a unique identifier as the root cause. As the ripple effect of the root cause is evaluated, each follow-on event may be linked back to the event identifier, thereby providing an understanding of a disruption condition.

A disruption may or may not cause a ripple effect for one or more aircraft 10, 12, 14, and 16. For example, a maintenance or crew event may only affect a single flight, whereas a weather event or airport closure may affect several flights. Similarly the duration of a delay caused by a particular disruption may make it difficult, if not impossible, to contain the impact to only one flight.

Embodiments of the present disclosure provide a notification (such as a conspicuous indicia) for each disruption. The notification may be categorized into one or more of the following: aircraft, crew, passenger, or ground, for example.

Figure 2:
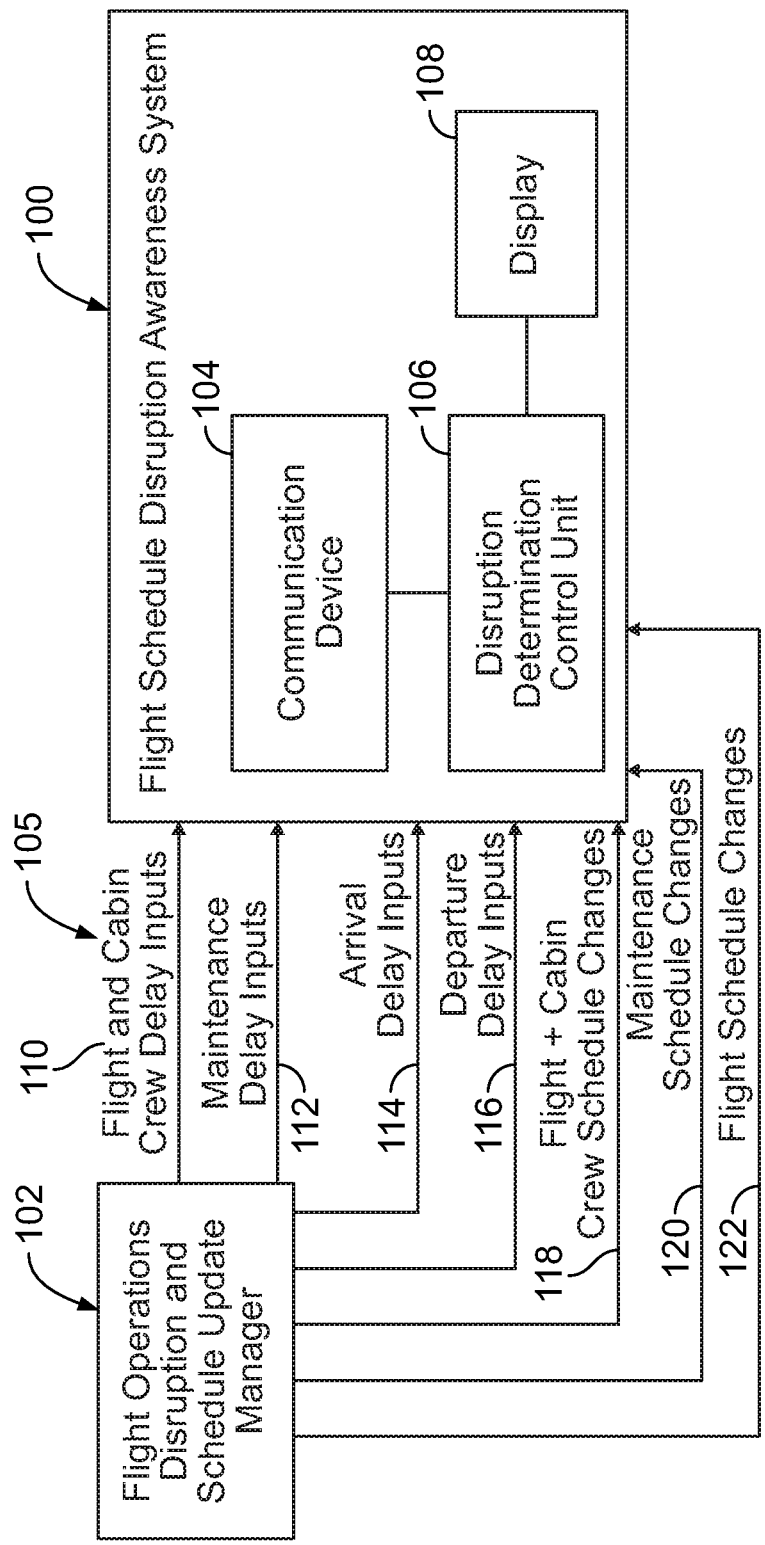
FIG. 2 is a simplified block diagram of a flight schedule disruption awareness system in communication with a flight operations disruption and schedule update manager, according to an exemplary embodiment of the present disclosure.

FIG. 2 is a simplified block diagram of a flight schedule disruption awareness system 100 in communication with a flight operations disruption and schedule update manager 102, according to an exemplary embodiment of the present disclosure. The flight schedule disruption awareness system 100 includes a communication device 104 that receives various flight schedule update inputs 105 (for example, flight operations schedule update inputs) from the flight operations disruption and schedule update manager 102. The communication device 104 is communicatively coupled to a disruption determination control unit 106, such as through one or more wired or wireless connections. The disruption determination control unit 106 is also communicatively coupled to a display 108 through one or more wired or wireless connections.

The communication device 104 may be configured to receive schedule updates and delay updates. The communication device 104 may be a single communication device that receives both the schedule updates and the delay updates. Optionally, the communication device 104 may include a first component that receives the schedule updates, and a second component that receives the delay updates.

The communication device 104 may be one or more components that are configured to receive the flight schedule update inputs 105 (for example, flight operations schedule update inputs) from the flight operations disruption and schedule update manager 102. For example, the communication device 104 may be a port of a computing system that is coupled to an input device (such as a keyboard, mouse, or the like) of the flight operations disruption and schedule update manager 102 that allows the flight schedule update inputs 105 to be directly input into the flight schedule disruption awareness system 100. In at least one other embodiment, the communication device 104 may be an antenna, transceiver, radio unit, and/or the like that is configured to receive wireless flight schedule update inputs 105 that are broadcast from the flight operations disruption and schedule update manager 102. As another example, the communication device 104 may be or include a modem, Ethernet connection, wireless interface, and/or the like that is in communication with the flight operations disruption and schedule update manager 102 through a private or public communication system, such as the Internet.

The flight operations disruption and schedule update manager 102 may be or include a computing system that receives various flight schedule (for example, flight operations schedule) updates regarding flight departures, arrivals, maintenance, passengers, airport resources, and/or the like in relation to one or more airports. In at least one embodiment, the flight operations disruption and schedule update manager 102 may be or include a central communication hub that receives and compiles various flight schedule updates. In at least one other embodiment, the flight operations disruption and schedule update manager 102 may be a computing system that is operated by an individual who receives various flight schedule updates and inputs the updates into the flight operations disruption and schedule update manager 102.

The flight operations disruption and schedule update manager 102 communicates the flight schedule updates to the flight schedule disruption awareness system 100 as the flight schedule update inputs 105 (for example, flight schedule updates regarding disruptions). The flight schedule update inputs 105 include one or more of flight and cabin crew delay (for example, schedule change) inputs 110, maintenance delay (for example, schedule change) inputs 112, arrival delay (for example, schedule change) inputs 114, departure delay (for example, schedule change) inputs 116, and/or the like. Other flight schedule update inputs 105 include airport fuel schedule change inputs, airport lavatory service schedule change inputs, airport gate availability schedule change inputs, airport takeoff slot assignment schedule change inputs, airport baggage service schedule change inputs, airport cargo schedule change inputs, etc. A schedule change may be an example of a possible delay, and may therefore be part of a delay input, whether or not the schedule change delays a flight or not. The flight schedule update inputs 105 may include flight and cabin crew schedule changes 118, maintenance schedule changes 120, and flight schedule changes 122. Flight schedule update inputs 105 may include airport fuel schedule change inputs, airport lavatory service schedule change inputs, airport gate availability schedule change inputs, airport takeoff slot assignment schedule change inputs, airport baggage service schedule change inputs, airport cargo schedule change inputs, and/or the like.

A flight and cabin crew delay input 110 (a "crew delay") represents a crew delay for a particular aircraft and/or relative to a particular crew schedule. The crew delay may be caused by a late-arriving crew (such as a pilot, co-pilot, flight attendants, and/or the like) for a particular flight. For example, the crew delay input 110 may represent a new crew schedule, as an overlay or delta.

A maintenance delay input 112 represents a maintenance delay in relation to a maintenance schedule, such as for a particular aircraft. The maintenance delay may be caused by a newly-discovered maintenance issue for a particular aircraft, which may be out of service, (such as a mechanical or electrical issue) that needs to be remedied before the aircraft may depart from an airport and/or return to service. For example, the maintenance delay input 112 may represent a new maintenance schedule, as an overlay or delta.

An unscheduled maintenance delay input represents an aircraft being taken out of service relative to a current aircraft assignment schedule. The unscheduled maintenance delay may be caused by a newly-discovered maintenance issue for a particular in-service aircraft (such as a mechanical or electrical issue) that needs to be remedied before the aircraft may return to service.

An arrival delay input 114 represents an arrival delay for a particular aircraft in relation to an airport. The arrival delay may be caused by inclement weather, air traffic congestion, and/or the like that may prevent an inbound flight from arriving at the airport at a scheduled arrival time. For example, an arrival delay input 114 may represent a new flight arrival schedule, as an overlay or delta.

A departure delay input 116 represents a departure delay for a particular aircraft in relation to an airport. The departure delay may be caused by inclement weather, air traffic congestion, and/or the like that may prevent an outbound flight from departing from the airport at a schedule arrival time. For example, a departure delay input 116 may represent a new flight departure schedule, as an overlay or delta.

An airport fuel schedule change input (not shown) represents a new airport fuel schedule, as an overlay or delta. An airport lavatory service change input (not shown) represents a new airport lavatory schedule, as an overlay or delta. An airport gate availability schedule change input (not shown) represents a new airport gate schedule, as an overlay or delta. An airport takeoff slot assignment schedule change input (not shown) represents an airport takeoff slot assignment crew schedule, as an overlay or delta. An airport baggage service schedule change input (not shown) represents a new airport baggage service schedule, as an overlay or delta. An airport cargo schedule change input (not shown) represents a new airport cargo service schedule, as an overlay or delta.

Each of the flight schedule update inputs 105 (including delay inputs and schedule change inputs) are communicated by the flight operations disruption and schedule update manager 102 to the flight schedule disruption awareness system 100. The flight schedule disruption awareness system 100 analyzes and uses the updated schedule information to assess future events that may or may not cause a flight schedule disruption, such as in relation to aircraft that are scheduled to arrive or depart in relation to the airport. In at least one embodiment, the event causes a flight schedule disruption if a scheduled arrival or departure time that is originally scheduled is affected (that is, changed), such as beyond a threshold value (for example), as determined by the disruption determination control unit 106.

The flight schedule disruption awareness system 100 receives the flight schedule update inputs 105 from the flight operations disruption and schedule update manager 102 (which may include a delay manager) via the communication device 104. The disruption determination control unit 106 analyzes and/or stores the flight schedule update inputs 105 that are to be used to determine whether or not future events represented by the flight schedule update inputs 105 cause flight schedule disruptions (for example, the disruptions shown and described with respect to FIG. 1). If the events do not cause flight schedule disruptions, the disruption determination control unit 106 refrains from showing the events as disruptions on the display 108. When the events cause flight schedule disruptions, the disruption determination control unit 106 shows the disruption (for example, the disrupting events) on the display 108.

The disruption determination control unit 106 determines whether the disruptions ripple throughout a flight schedule to cause disruptions in other flights (such as segments or legs of an aircraft and/or other aircraft). The disruption determination control unit 106 determines and indicates all disruptions to a particular aircraft (that is, one or more scheduled flights of the aircraft) and other aircraft (that is, one or more scheduled flights of the other aircraft) that are caused by an initial disruption in a schedule. The initial disruption is determined to be the root cause. The disruption determination control unit 106 labels the initial disruption as the root cause on the display 108 and shows the other disruptions to other legs of the aircraft and/or other aircraft that ripple from the root cause. A disruption may have multiple root causes, associated with different resource ripple effects.

The disruption determination control unit 106 aggregates a plurality of disruptions (for example, disruptive events) for one or more flights and shows them in an integrated, summary presentation on the display 108. As such, an individual (such as an airline operations controller) may view the integrated, summary presentation of the disruptive events on the display 108 in order to efficiently determine possible flight operations delays for an aircraft and/or a fleet of aircraft. In this manner, the individual may quickly and efficiently assess the situation, determine contingency plans and/or alternate plans for alleviating the flight schedule disruptions.

Figure 3A:
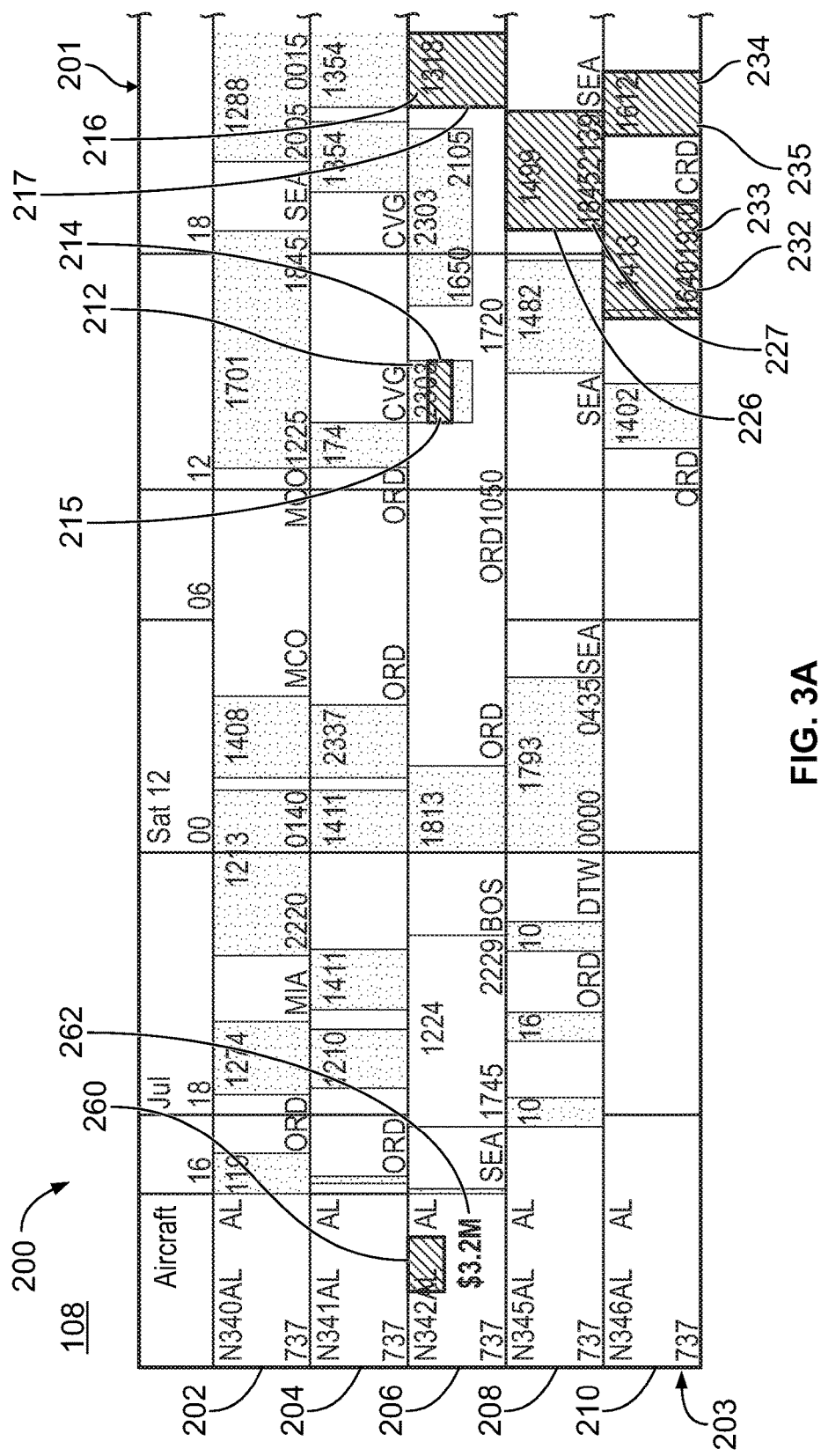
FIG. 3 (which is comprised of FIGS. 3A and 3B joined together as shown) is a front view of a display of a flight schedule disruption awareness system, according to an exemplary embodiment of the present disclosure.
Figure 3B:
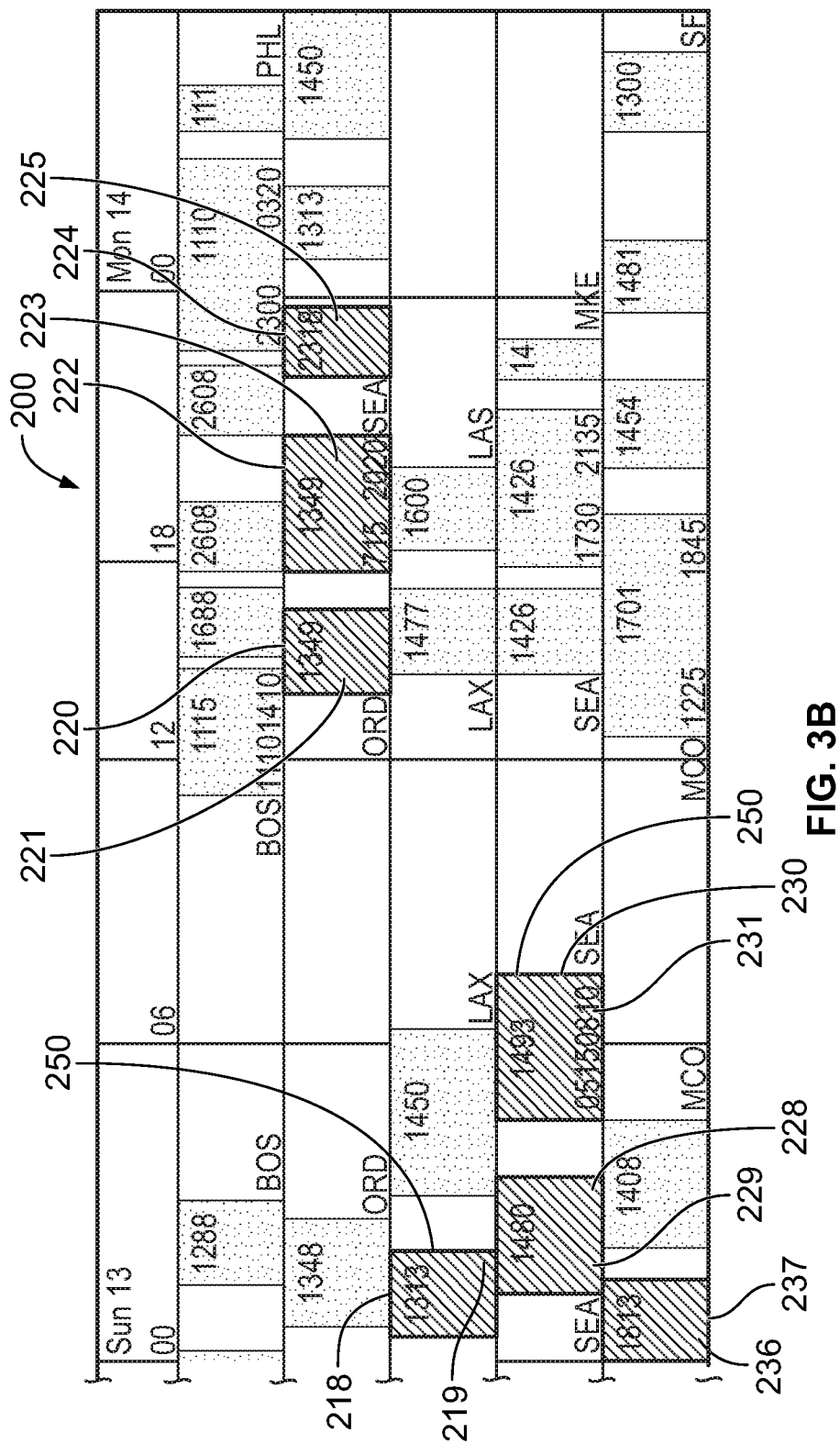

FIG. 3 (which is comprised of FIGS. 3A and 3B joined together as shown) is a front view of the display 108 of the flight schedule disruption awareness system 100 (shown in FIG. 2), according to an exemplary embodiment of the present disclosure. Referring to FIGS. 2 and 3, the disruption determination control unit 106 shows a flight schedule 200 on the display 108. The flight schedule 200 includes a time axis 201 and an aircraft axis 203203. The time axis 201 includes dates and times for various flights. The aircraft axis 203 shows the flight legs for particular aircraft. For example, as shown in FIG. 3, the aircraft axis 203 includes aircraft 202, aircraft 204, aircraft 206, aircraft 208, and aircraft 210. Each aircraft 202, 204, 206, 208, and 210 is scheduled to fly multiple legs during the time indicated by the time axis 201.

The disruption determination control unit 106 determines that a late arrival 212 of the aircraft 206 is a root cause flight disruption 214 for various other disruptions of the flight schedule 200. The root cause flight disruption 214 may be indicated with a particular, conspicuous root cause indicia 215 (such as a specific color, notation, graphic, and/or the like) that clearly indicates it as the root cause flight disruption 214. The root cause flight disruption 214 of the aircraft 206 causes disruptions 216 and 218 in subsequent legs 217 and 219 of the aircraft 206. Additionally, the root cause flight disruption 214 causes disruptions 220, 222, and 224 in legs 221, 223, and 225, respectively, of the aircraft 204. Further, the root cause flight disruption 214 causes disruptions 226, 228, and 230 in legs 227, 229, and 231, respectively, of the aircraft 208. Also, the root cause flight disruption 214 causes disruptions 232, 234, and 236 in legs 233, 235, and 237 of the aircraft 210. Each disruption 220, 222, 224, 226, 228, 230, 232, 234, and 236 may be indicated with a conspicuous caused-disruption indicia 250, such as a color coded box, notation, graphic, and/or the like. In at least one embodiment, the disruptions caused by the root cause flight disruption 214 are linked via indicia back to the root cause flight disruption 214. For example, the root cause flight disruption 214 may be shown with the root cause indicia 215, which may be a unique color, shape, notation, graphic, and/or the like (such as a red or orange cross bar through the noted event), while the caused-disruption indicia 250 may be boxes around the subsequent events that are correlated with the root cause indicia 215 (for example, the same color, notation, and/or graphic as the root cause indicia 215). As such, the disruption determination control unit 106 clearly indicates the various disruptions on the flight schedule 200. The non-disruption events (for example, legs of flights that depart and arrive as originally scheduled) are not labeled or otherwise noted as disruptions. Instead, only the disruptions 214, 220, 222, 224, 226, 228, 230, 232, 234, and 236 are provided with unique and distinct indicia as being disruptive events are indicated on the flight schedule 200, thereby allowing an individual to quickly and readily determine the existence of the various disruptions.

Additionally, the disruption determination control unit 106 may provide a disruption indicator 260 (such as a distinct color, notation, graphic, and/or the like) in relation to the aircraft axis 203. For example, the disruption indicator 260 may be a color coded label on the listed aircraft 206, which indicates that a leg of the aircraft 206 is the root cause flight disruption 214. An individual may view the disruption indicator 260 and may then follow the time axis 201 along the row for the aircraft 206 to quickly and readily find the root cause flight disruption 214. Further, the disruption indicator 260 may provide an area on the flight schedule 200 to open (such as via an input device, such as a mouse, touchscreen, and/or the like) in order to view the details of the root cause flight disruption 214. Additionally, the disruption determination control unit 106 may provide a monetary impact indicator 262, which provides a monetary cost of the root cause flight disruption 214. As shown in FIG. 3, the monetary cost of the root cause flight disruption 214 is shown by the monetary impact indicator 262 as $3.2 million.

The flight schedule 200 may be over a shorter or longer time period than shown. Further, the flight schedule 200 may include more or less aircraft than shown.

Figure 4:
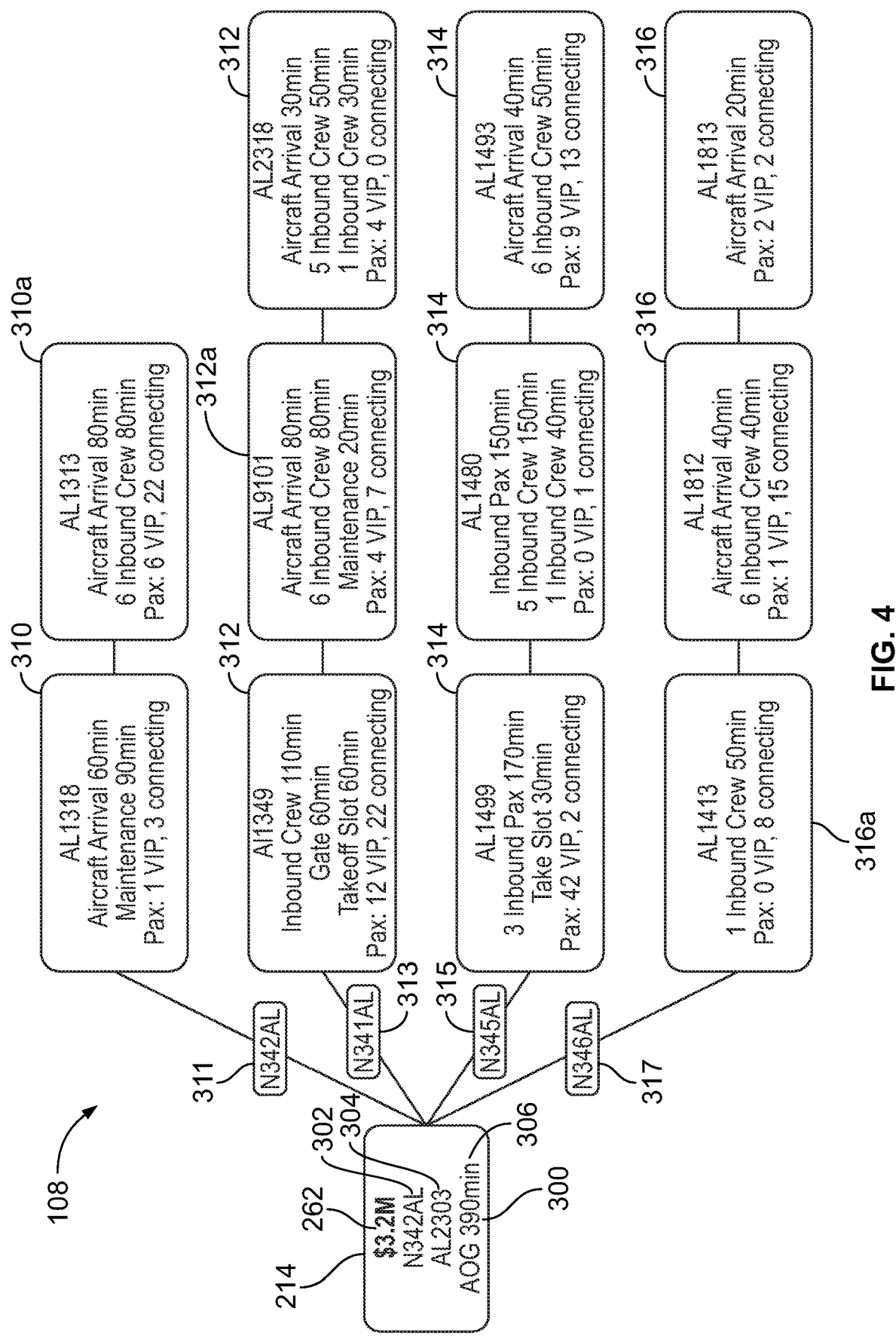
FIG. 4 is front view of a display of a flight schedule disruption awareness system, according to an exemplary embodiment of the present disclosure.

FIG. 4 is front view of the display 108 of the flight schedule disruption awareness system 100 (shown in FIG. 2), according to an exemplary embodiment of the present disclosure. Referring to FIGS. 2-4, in at least one embodiment, the disruption determination control unit 106 may only show the disruptions within a flight schedule without showing legs of flights that are not disrupted (or even the full flight schedule 200, as shown in FIG. 3). In at least one embodiment, the representation shown on FIG. 4 may be after an individual opens the disruption indicator 260 shown and described with respect to FIG. 3.

In at least one embodiment, the root cause flight disruption 214 is shown as root cause box 300 that lists the aircraft 302, leg 304, and disruptive event 306. The monetary impact indicator 262 may also be shown in the root cause box 300. The root cause box 300 is linked with various other disruption boxes 310 indicating disruptions for legs of aircraft 311, disruption boxes 312 indicating disruptions for legs of aircraft 313, disruption boxes 314 for legs of aircraft 315, and disruption boxes 316 for legs of aircraft 317. As shown, the root cause box 300 indicating the root cause flight disruption 214 is linked to the various other disruptions, clearly and unambiguously shows the ripple effect of the root cause flight disruption 214 through the entire flight schedule 200 (shown in FIG. 3).

As noted, the various disruptions may be shown in boxes, such as the root cause box 300, and the disruption boxes 310, 312, 314, and 316. The disruption boxes 310, 312, 314, and 316 may also list the aircraft, leg, and disruptive event. Optionally, the disruptions may be shown in and/or as various other features, such as circles, windows, and or as simply plan text.

The disruptive events shown in the root cause box 300 and/or the disruption boxes 310, 312, 314, and 316 may indicate a type of disruptive event (for example, an aircraft, crew, passenger, or the like disruption), a duration or predicted duration of the disruption, and individuals affected by the disruption. For example, disruption box 312a indicates that flight leg AL9101 of aircraft 313 (N341AL) has an aircraft arrival disruption of 80 minutes, an inbound crew disruption of 80 minutes, and a maintenance disruption of 80 minutes. Such disruptions affect 4 VIP and 7 connecting passengers. As another example, disruption box 316a indicates that leg AL1413 of aircraft 317 (N346AL) has an inbound crew disruption of 50 minutes, which affects 0 VIP passengers, and 8 connecting passengers.

Figure 5:
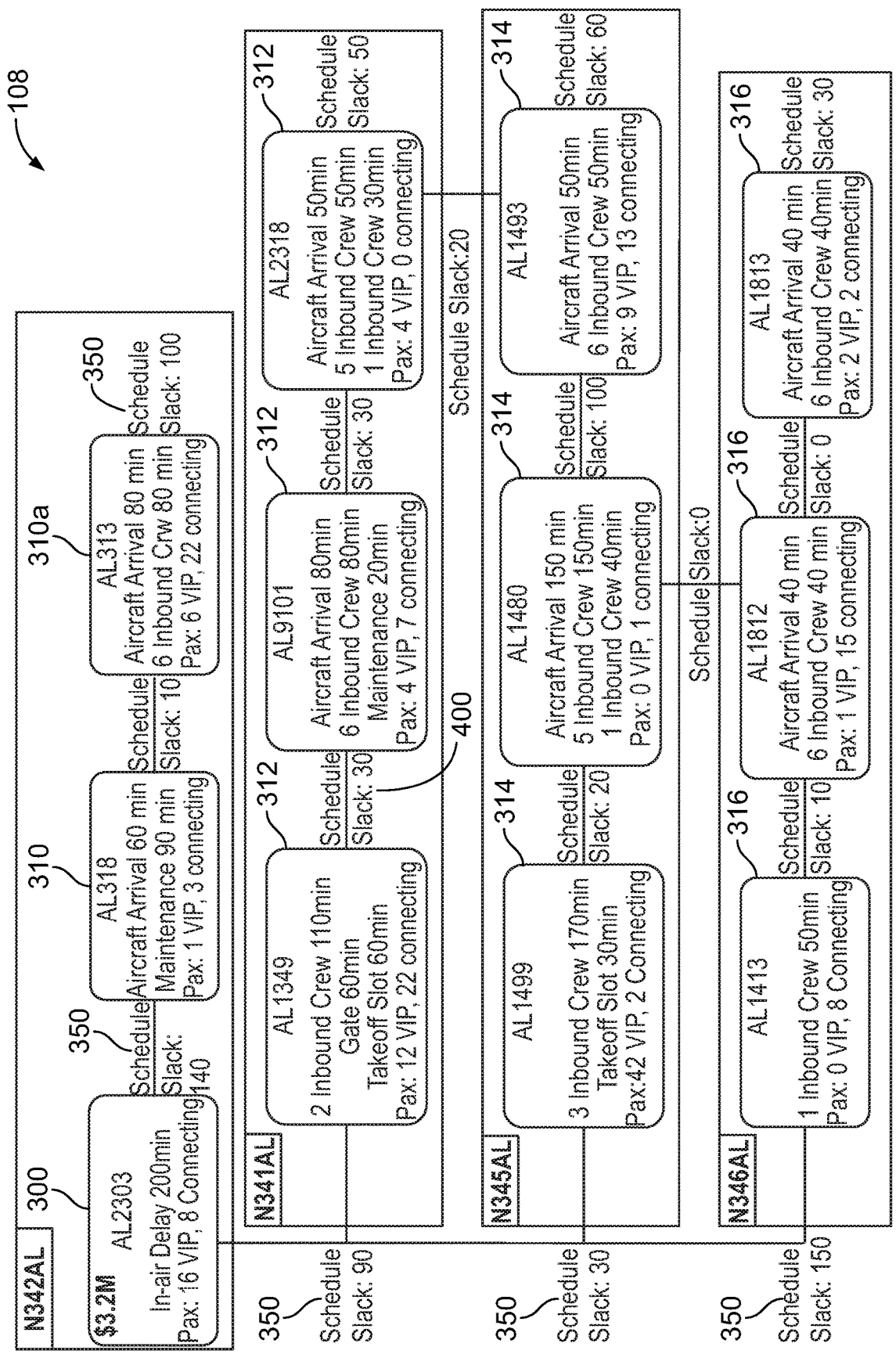
FIG. 5 is front view of a display of a flight schedule disruption awareness system, according to an exemplary embodiment of the present disclosure.

FIG. 5 is front view of the display 108 of the flight schedule disruption awareness system 100 (shown in FIG. 2), according to an exemplary embodiment of the present disclosure. Referring to FIGS. 2-5, in the embodiment, the disruption determination control unit 106 may only show the disruptions within a flight schedule without showing legs of flights that are not disrupted. In at least one embodiment, the representation shown on FIG. 5 may be after an individual opens the disruption indicator 260 shown and described with respect to FIG. 3.

The embodiment shown in FIG. 5 is similar to that of FIG. 4, except that the display 108 shown in FIG. 5 may also include schedule slack indicators 350 for various legs of the flights of the aircraft. The schedule slack indicator 350 indicates a slack value for the legs. The slack value represents a resource-specific time buffer value between each of the flights (for example, flight legs of particular aircraft). By showing the schedule slack indicators 350 on the display 108, the disruption determination control unit 106 provides an operator with additional situational awareness into flight schedule disruptions. As such, the operator may readily determine whether or not certain flights may be changed so as to absorb overall delays and reduce an overall impact of the disruptions.

For example, as shown in FIG. 5, flight number AL313 as shown in disruption box 310a may arrive 80 minutes late. Such a late arrival is not a disruption because the aircraft has 100 minutes of slack in its schedule before its next flight. As such, the disruption determination control unit 106 would not note a disruption on the display 108. Accordingly, the flight schedule disruption awareness system 100 does not concern airline operations management with events that do not affect the flight schedule.

Referring to FIGS. 2-5, in at least one embodiment, the display 108 is a monitor that is configured to electronically show graphics, videos, and/or the like. For example, the display 108 may be a liquid crystal display (LCD) screen, a light-emitting diode (LED) screen, a cathode ray tube screen, a plasma screen, a computer monitor, and/or the like. The display 108 provides flight areas (such as electronic windows, pop-ups, or other such defined screen areas), such as flight operations schedule disruption areas, for one or more flights.

Referring to FIGS. 4-5, the disruption boxes 310, 312, 314, and 316 for the disruptive event shown in the root cause box 300 are organized by aircraft. Alternative organizations may be presented, at the option of the operator, such as in relation to at least one of crew, maintenance, departure airport, arrival airport, and/or the like.

As described, the disruption determination control unit 106 determines that a delay disrupts a flight schedule (and shows the disruption on the display 108). A disruption is measured against a current flight schedule (for example, a current flight operations schedule), which includes schedules for particular flights of various aircraft. When various events change (whether disruptive events or non-disruptive events), one or more existing disruptions may become moot, and one or more new disruptions may be created. As such, the flight schedule disruption awareness system 100 may continually monitor events and update a flight schedule based on changing circumstances.

Referring again to FIG. 2, in at least one embodiment, the disruption determination control unit 106 receives updated operations schedules from the flight operations disruption and schedule update manager 102 through the communication device 104 and reevaluates all disruptions against all current flight schedules (for example, a current flight operations schedule, maintenance schedule, and/or the like). Changes to the current flight schedule disruption situation are displayed 108 so that some existing schedule disruption information may be removed or changed, and new disruption information may be presented to the operator.

The disruption determination control unit 106 determines which events cause disruptions that affect the flight schedule. In at least one embodiment, the disruption determination control unit identifies the type and duration of the schedule impact by recursively assessing all the resources (for example, passengers, aircraft, cabin and cockpit crewmembers, maintenance) and airport (gate, catering, fuel, baggage, lavatory and cargo, etc.) associated with the affected flight(s), allowing day-of-operations management to have immediate visibility to the full and complete impact on the schedule. The disruption determination control unit 106 may show the estimated schedule impact relative costs and lost value of the disruption on the display 108.

The flight schedule disruption awareness system 100 is configured to determine and display multiple factors and their relation to various delays that may affect the flight schedule 200. The flight schedule disruption awareness system 100 displays multiple delays in a way that improves situational awareness for airline operations staff. For example, an operations manager may view the display 108, and take an action or initiate an action for evaluation. Overall, the flight schedule disruption awareness system 100 is configured to show multiple impacts to scheduled flights in relation to multiple aspects of the scheduled flights.

While a disruption may affect more than one flight, a flight may also be affected by more than one disruption. Remedying a crew problem with a flight may have no effect on the flight schedule if the flight is also held for line maintenance work. The flight schedule disruption awareness system 100 provides airline operations management with a full resource disruption effect for each flight in order to make informed decisions as to the most pertinent issues to address.

Disruptions may have different impacts that are not plain and clear from the duration of the disruption. The flight schedule disruption awareness system 100 analyzes and displays the resource-specific disruptions for flights (for example, legs), and costs of the disruptions, thereby allowing airline operations management to effectively triage current delays in the flight schedule.

The flight schedule disruption awareness system 100 may be located at an airport. In at least one other embodiment, the flight schedule disruption awareness system 100 may be located at a central monitoring location that is remotely located from the airport. In at least one other embodiment, the flight schedule disruption awareness system 100 may be onboard an aircraft. In at least one other embodiment, the flight schedule disruption awareness system 100 may be on a mobile device. In at least one other embodiment, the flight disruption awareness system 100 may be located on a virtual infrastructure system, such as a data cloud. The flight schedule disruption awareness system 100 may be centrally located at an operations control center, or may be located at a particular airport, station, hub, and/or the like, thereby allowing the station or hub operations manager to be aware of flights that are within their control.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the disruption determination control unit 106 may be or include one or more processors that are configured to control operation of the flight schedule disruption awareness system 100, as described herein.

The disruption determination control unit 106 is configured to execute a set of instructions that are stored in one or more data storage units or elements (such as one or more memories), in order to process data. For example, the disruption determination control unit 106 may include or be coupled to one or more memories. The data storage units may also store data or other information as desired or needed. The data storage units may be in the form of an information source or a physical memory element within a processing machine.

The set of instructions may include various commands that instruct the disruption determination control unit 106 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the disruption determination control unit 106. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the disruption determination control unit 106 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As described herein, embodiments of the present disclosure provide a flight schedule disruption awareness system 100 that is configured to provide situational awareness of flight disruptions that affect a flight schedule for flights. The flight schedule disruption awareness system 100 includes the disruption determination control unit 106 that is configured to receive a plurality of flight schedule update inputs 105 (including disruptions, schedule changes, and/or the like) related to flight schedule updates to the flight schedule 200. The disruption determination control unit 106 determines one or more flight disruptions from the plurality of flight schedule update inputs 105. The disruption determination control unit 106 correlates the flight disruptions of one aircraft with one or more flight disruptions of other aircraft based on current flight schedules for the various aircraft.

Figure 6:
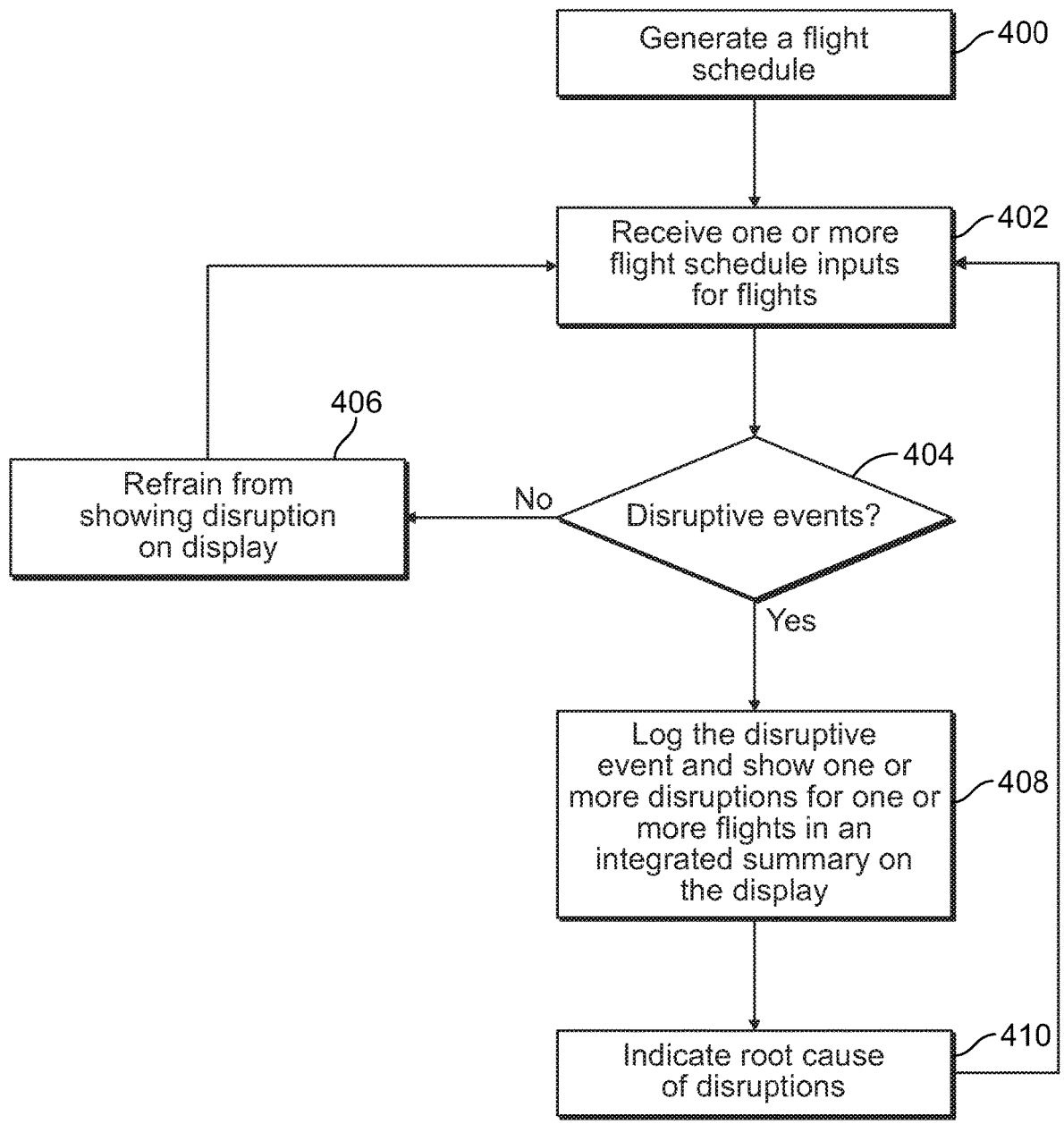
FIG. 6 is a flow chart of a flight disruption awareness method, according to an exemplary embodiment of the present disclosure.

FIG. 6 is a flow chart of a flight disruption awareness method, according to an exemplary embodiment of the present disclosure. Referring to FIGS. 2 and 6, the method begins at 400, at which a flight schedule is generated. In at least one embodiment, the flight operations disruption and schedule update manager 102 may generate, receive, and or transmit the flight schedule, and/or updates thereto.

At 402, the disruption determination control unit 106 of the flight schedule disruption awareness system 100 receives one or more flight schedule inputs (including disruptions) for flights, such as via the communication device 104. The inputs may relate to various delays, which may or may not impact a departure and/or arrival of particular flights.

At 404, the disruption determination control unit 106 determines whether the received flight schedule inputs are disruptive events. A disruptive event impacts a scheduled arrival or departure of a particular flight of an aircraft, and/or one or more flights of other aircraft. If not a disruptive event, the method proceeds from 404 to 406, at which the disruption determination control unit 106 logs the delay and refrains from showing a disruption on the display 108. The method may then return to 402.

If, however, the received inputs provide at least one disruptive event at 404, the disruption determination control unit 106 logs the disruptive event (such as a delay) and shows one or more disruptions for one or more flights in an integrated summary on the display at 408. At 410, the disruption determination control unit 410 may indicate a root cause of the disruptions on the display 108. The method then returns to 402.

Referring again to FIGS. 1 and 2, in at least one embodiment, the disruption determination control unit 106 may analyze ripple effects of disruptions on a flight schedule through directed acyclic graphs (DAG). The DAG is topological with the root disruptive event representing first vertices and each line (edge) with a value (time) between the subsequent events (vertices). Because a disruption occurs over a time horizon, the DAG also represents a collection of events and their influences on each other, either in a probabilistic structure such as a Bayesian network or as a record of historical data such as a family tree. The union of all current DAGs creates a flight schedule disruption network.

In at least one embodiment, events are disruptions that affect the flight schedule and alerts are impacts to resources due to an event but have not impacted the flight schedule. An unresolved alert may become an event if it then impacts the flight schedule. Thus there can be many events that compound an impact to a flight, but there is a single resource-specific event that is the root cause of the disruption that is termed the root event.

In at least one embodiment, the disruption determination control unit 106 receives an irregular condition, such as a disruption. The irregular condition is indicative of an event that may cause at least one change to an aircraft, a flight schedule, and/or the like. For example, the disruption determination control unit 106 may receive the irregular condition from the flight operations disruption and schedule update manager 102.

The disruption determination control unit 106 may make an initial assessment as to whether the event impacts a fleet of aircraft. If there is no impact to the fleet, the disruption determination control unit 106 ends the analysis.

To determine if the irregular event is due to a prior irregular event, the disruption determination control unit 106 may evaluate a preceding flight leg to determine if the preceding flight leg was on schedule. If the preceding flight leg was not on schedule, the disruption determination control unit 106 uses an event identifier of the preceding flight leg and associates it with the current flight.

The disruption determination control unit 106 may process each alert. If there is another alert, the disruption determination control unit 106 may determine if it impacts the flight schedule.

The disruption determination control unit 106 may identify all resources impacted by an event. After each alert, the disruption determination control unit assembles a DAG, creating a new DAG network or adding to an existing DAG network.

The disruption determination control unit 106 may also determine if resources have capacity to absorb an impact of an event, referred to as schedule slack. The disruption determination control unit may analyze constraints of an aircraft. Aircraft may be constrained by maintenance related issues such as reduced speed, ceiling, or weather, by configuration, and/or by major/minor model.

The disruption determination control unit 106 may also analyze crew constraints. Flight crews are constrained by factors, such as qualifications to operate the make and model of aircraft into and out of specific airports under specific conditions, e.g. at night. Cabin crew are constrained by qualifications to operate emergency equipment for different makes and models of aircraft and may be constrained by language requirements. All crew are constrained by regulatory rules and sometimes also by contractual terms that limit their availability.

The disruption determination control unit 106 may also analyze passenger constraints. Passengers are primarily impacted by their ability to make their connections to other flights on their itinerary and their status with the airline.

The disruption determination control unit 106 may also analyze ground constraints. Ground constraints include airport curfews, gate availability, availability of services required to turn the aircraft for the next leg, and the like.

The disruption determination control unit 106 may evaluate the impacts of the root event by determining resource dependencies and their resource-specific schedule slack times. The disruption determination control unit 106 may find all scheduled resources for a flight, and a schedule slack time for a disrupted resource before a next flight (for example, a leg).

The disruption determination control unit 106 may find the aircraft constrained due to a maintenance event, or look up crew constraints (for example, duty time limitations, availability, etc.). The disruption determination control unit 106 may also look-up the passenger constraints (for example, connections, class, status, etc.). The disruption determination control unit 106 may look-up ground constraints (for example, airport curfews, gate assignments, services, etc.).

For each resource, the disruption determination control unit 106 may determine if the disruption duration exceeds the scheduled turn time between flights by calculating a transitive closure time for dependent resources. The disruption determination control unit 106 may determine a critical path by identifying the longest transitive closure time. The disruption determination control unit 106 may evaluate if a maximum calculated limit exceeds the schedule slack for the disrupted resource.

The disruption determination control unit 106 may evaluate if there is anything new to evaluate. If yes, the disruption determination control unit 106 finds a next scheduled flight for each new resource. The disruption determination control unit 106 may then assemble the DAG and create event metrics.

In at least one embodiment, the disruption determination control unit 106 may create an alert for each flight having one irregular condition. For example, the disruption determination control unit 106 may generate an irregular condition alert. If the irregular condition relates to a crew, then the next flight from the latest crew schedule is found, and an alert is created with irregular condition, flight number, and start and end times. Each alert may be linked to the irregular condition.

If the irregular condition is not a crew type, the disruption determination control unit 106 may determine if the irregular condition is a maintenance type. If so, then the next flight from the latest flight schedule is found, and an alert is created with irregular condition, flight number, and start and end times. Each alert is linked to the irregular condition.

If not a crew or maintenance type of irregular condition, then the disruption determination control unit 106 may determine whether the irregular condition is an airport station type. If so, then the disruption determination control unit 106 may determine if an aircraft is on the ground during the irregular condition. If so, the current flight from the latest gate schedule is found, and an alert is created with irregular condition, flight number, and start and end times. Each alert is linked to the irregular condition.

If not a crew, maintenance, or station type of irregular condition, the disruption determination control unit 106 may determine that the event is undefined without creating an event.

In at least one embodiment, the disruption determination control unit 106 may determine whether an alert causes an event (for example, a flight schedule impact). The disruption determination control unit 106 may analyze an alert, such as by first determining if the flight is in the air during the alert duration. If so, the disruption determination control unit 106 creates an event by creating a directed graph with resource and flight number.

If the flight is not in the air during the alert duration, the disruption determination control unit 106 determines if the alert identifies a canceled situation. If so, an event is created by creating a directed graph with resource and flight number.

In at least one embodiment, the disruption determination control unit 106 may calculate the schedule slack for the disrupted resource time before the next flight for the resource is found from the resource-specific operational schedule. If the schedule slack for the disrupted resource is less than the event duration, then an event is created by creating a directed graph with resource and flight number. The alert is linked to the event. If the schedule slack for the disrupted resource is not less than the event duration, the disruption determination control unit 106 records the schedule slack for the disrupted resource but refrains from creating an event.

In at least one embodiment, the disruption determination control unit 106 may find a scheduled resource for a flight. The disruption determination control unit 106 finds assigned station resources by finding an airport gate, baggage service, water service, fuel service, catering service, deicing service, a slot, customs and/or border protection, and/or security services for the flight. The disruption determination control unit 106 finds an assigned flight, airplane, crew, maintenance, and passengers.

The disruption determination control unit 106 may also find the schedule slack for the disrupted resource before a next scheduled flight for a resource. If the resource is associated with a flight cancellation or diversion, the schedule slack for the disrupted resource is set to zero. If, however, the resource is not associated with a flight cancellation or diversion, the disruption determination control unit 106 may determine a passenger resource, and if so, the schedule slack for the disrupted resource is set to passenger connection time minus minimum connection time.

If the resource is an aircraft resource, the disruption determination control unit 106 may find an airplane major and minor model. A determination is then made if the aircraft is in the air at the beginning of the event, and if so, the aircraft schedule slack is set to minimum arrival airport turn time for the aircraft model.

If the resource is a crew resource, the disruption determination control unit 106 may determine if the crew is in the air at the beginning of the event. If the crew is in the air at the beginning of the event, the crew schedule slack is set to the minimum arrival airport crew connection. If the crew is not in the air at the beginning of the event, the crew schedule slack is set to the minimum departure airport crew connection.

If the resource is a maintenance resource, the disruption determination control unit 106 may set the maintenance schedule slack to the duration before the unscheduled maintenance start.

The disruption determination control unit 106 may determine if the resource is an air-side airport station resource. If so, the air-side airport station schedule slack is set to a minimum resource-specific reassignment time.

The disruption determination control unit 106 may determine if there is an airport curfew. If so, the airport curfew schedule slack is set to zero.

In at least one embodiment, the disruption determination control unit 106 may be constrained by a maximum calculation limit. The disruption determination control unit 106 first finds a maximum event horizon. If an execution time has been exceeded, the maximum calculation limit is set.

If, however, the execution time has not been exceeded, the disruption determination control unit 106 may be constrained by a maximum number of flights. If the maximum number of flights has been exceeded, the maximum calculation limit is set.

If, however, the maximum number of flights has not been exceeded, the disruption determination control unit 106 may be constrained by a maximum number of resources. If the maximum number of resources has been exceeded, the maximum calculation limit is set.

If, however, the maximum number of resources has not been exceeded, the disruption determination control unit 106 may be constrained by a maximum impact duration. If the maximum impact duration has been exceeded, the maximum calculation limit is set. If the maximum impact duration has not been exceeded, the maximum calculation limit is not set.

In at least one embodiment, the disruption determination control unit 106 may sum one or more of the following: a number of affected crew by type, a number of maintenance disruptions by type, a number of station disruptions by type, a number of affected flights, a number of affected passengers by class, and/or a number of affected connecting passengers by class. If there is a delay event, then the delay number of minutes is summed, the station delay number of minutes is summed, the maintenance delay number of minutes is summed, and the crew delay number of minutes is summed. Cost factors are then applied, and the total effect is summarized into an event scale.

Figure 7:
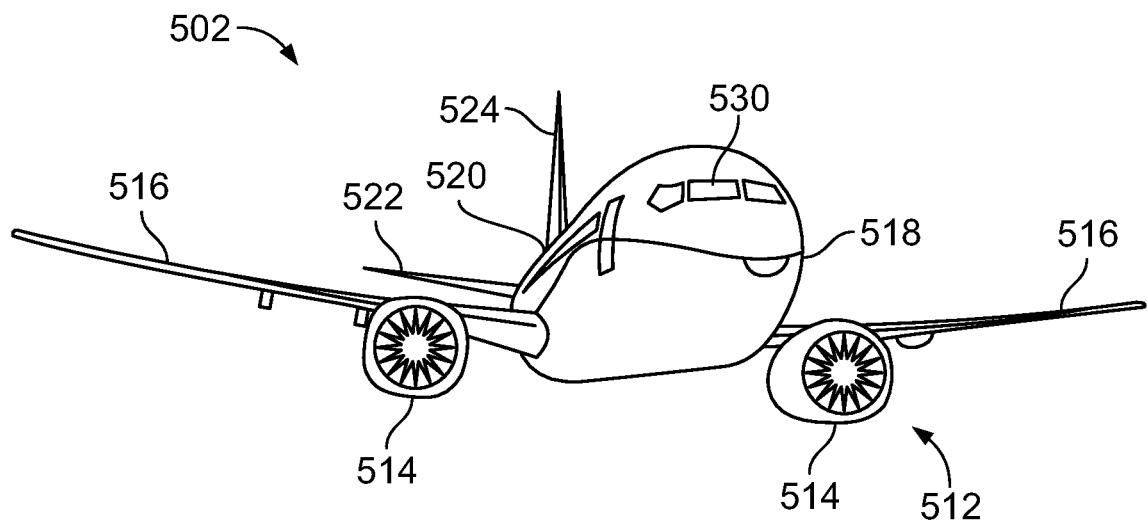
FIG. 7 is a diagrammatic representation of a front perspective view of an aircraft, according to an exemplary embodiment of the present disclosure.

FIG. 7 is a diagrammatic representation of a front perspective view of an aircraft 502, according to an exemplary embodiment of the present disclosure. The aircraft 502 includes a propulsion system 512 that may include two turbofan engines 514, for example. Optionally, the propulsion system 512 may include more engines 514 than shown. The engines 514 are carried by wings 516 of the aircraft 502. In other embodiments, the engines 514 may be carried by a fuselage 518 and/or an empennage 520. The empennage 520 may also support horizontal stabilizers 522 and a vertical stabilizer 524. The fuselage 518 of the aircraft 502 defines an internal cabin, which may include a cockpit 530, one or more work sections (for example, galleys, personnel carry-on baggage areas, and the like), one or more passenger sections (for example, first class, business class, and coach sections), and an aft section in which an aft rest area assembly may be positioned. The aircraft 502 is configured to embark on flights, including multiple legs.

Referring to FIGS. 1-7, embodiments of the present disclosure provide systems and methods that allow large amounts of data to be quickly and efficiently analyzed by a computing device. For example, numerous aircraft may be scheduled to arrive at and/or depart from various airports. As such, large amounts of data are being tracked and analyzed. The vast amounts of data are efficiently organized and/or analyzed by the flight schedule disruption awareness system 100, as described above. The flight schedule disruption awareness system 100 analyzes the data in a relatively short time in order to quickly and efficiently output and/or display various delays for the various aircraft (that is, particular flights of the aircraft) that are scheduled to arrive at and/or depart from one or more airports. For example, the flight schedule disruption awareness system 100 analyzes current flight data and flight schedule update inputs 105 (including disruptions) and determines and displays disruptions for the various aircraft in real time. A human being would be incapable of efficiently analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described herein, embodiments of the present disclosure provide systems and methods of improving situational awareness of flight disruptions. Further, embodiments of the present disclosure provide systems and methods of identifying multiple elements that may impact or cause flight disruptions in order to allow for quick and efficient operational situational awareness and decisions by operations staff.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flight schedule disruption awareness system that is configured to provide situational awareness of flight disruptions that affect a flight schedule for a plurality of flights, the flight schedule disruption awareness system comprising:
a disruption determination control unit that is configured to receive a plurality of flight schedule update inputs related to flight schedule updates to the flight schedule, wherein the disruption determination control unit determines a root cause flight disruption from the plurality of flight schedule update inputs, wherein the root cause flight disruption affects flights of a plurality of aircraft.

2. The flight schedule disruption awareness system of claim 1, further comprising a display in communication with the disruption determination control unit, wherein the disruption determination control unit is configured to show the root cause flight disruption on the display.

3. The flight schedule disruption awareness system of claim 2, wherein the disruption determination control unit indicates the root cause flight disruption on the display via a particular, conspicuous root cause indicia.

4. The flight schedule disruption awareness system of claim 2, wherein the disruption determination control unit is configured to show other disruptions to the flights of the plurality of aircraft caused by the root cause flight disruption.

5. The flight schedule disruption awareness system of claim 4, wherein the disruption determination control unit links the other disruptions to the root cause flight disruption.

6. The flight schedule disruption awareness system of claim 4, wherein the disruption determination control unit indicates the other disruptions on the display via caused-disruption indicia.

7. The flight schedule disruption awareness system of claim 2, wherein the disruption determination control unit is configured to show a portion of the flight schedule on the display, and wherein the disruption determination control unit is configured to show the root cause flight disruption on the portion of the flight schedule.

8. The flight schedule disruption awareness system of claim 7, wherein the disruption determination control unit is configured to show other disruptions to the flights of the plurality of aircraft caused by the root cause flight disruption on the portion of the flight schedule.

9. The flight schedule disruption awareness system of claim 2, wherein the disruption determination control unit is configured to show a disruption indicator in relation to an aircraft on the display, wherein the disruption indicator indicates that the root cause flight disruption occurs during a leg of the aircraft.

10. The flight schedule disruption awareness system of claim 2, wherein the disruption determination control unit is configured to show a monetary impact indicator of the root cause flight disruption on the display.

11. The flight schedule disruption awareness system of claim 2, wherein the disruption determination control unit only shows the root cause flight disruption and other disruptions caused by the root cause flight disruption on the display without showing legs of flights that are not disrupted.

12. The flight schedule disruption awareness system of claim 2, wherein the disruption determination control unit is configured to show the root cause flight disruption on the display in relation to an aircraft, leg, and disruptive event on the display.

13. The flight schedule disruption awareness system of claim 12, wherein the disruption determination control unit is configured to show individuals affected by the disruptive event on the display.

14. The flight schedule disruption awareness system of claim 2, wherein the disruption determination control unit is configured to show schedule slack indicators on the display.

15. A flight schedule disruption awareness system that is configured to provide situational awareness of flight disruptions that affect a flight schedule for a plurality of flights, the flight schedule disruption awareness method comprising:
  receiving, by a disruption determination control unit, a plurality of flight schedule update inputs related to flight schedule updates to the flight schedule; and
  determining, by the disruption determination control unit, a root cause flight disruption from the plurality of flight schedule update inputs, wherein the root cause flight disruption affects flights of a plurality of aircraft.

16. The flight schedule disruption awareness method of claim 15, further comprising showing the root cause flight disruption on a display that is in communication with the disruption determination control unit.

17. The flight schedule disruption awareness method of claim 16, wherein the showing comprises:
  indicating the root cause flight disruption on the display via a particular, conspicuous root cause indicia; and
  showing other disruptions to the flights of the plurality of aircraft caused by the root cause flight disruption, wherein the showing other disruptions comprises indicating the other disruptions on the display via caused-disruption indicia.

18. The flight schedule disruption awareness method of claim 17, further comprising linking the other disruptions to the root cause flight disruption.

19. The flight schedule disruption awareness method of claim 16, further comprising:
  showing a disruption indicator in relation to an aircraft on the display, wherein the disruption indicator indicates that the root cause flight disruption occurs during a leg of the aircraft;
  showing a monetary impact indicator of the root cause flight disruption on the display; and
  showing schedule slack indicators on the display.

20. A flight schedule disruption awareness system that is configured to provide situational awareness of flight disruptions that affect a flight schedule for a plurality of flights, the flight schedule disruption awareness system comprising:
  a disruption determination control unit that is configured to receive a plurality of flight schedule update inputs related to flight schedule updates to the flight schedule, wherein the disruption determination control unit determines a root cause flight disruption from the plurality of flight schedule update inputs, wherein the root cause flight disruption affects flights of a plurality of aircraft; and
  a display in communication with the disruption determination control unit, wherein the disruption determination control unit is configured to show the root cause flight disruption on the display, wherein the disruption determination control unit indicates the root cause flight disruption on the display via a particular, conspicuous root cause indicia, wherein the disruption determination control unit is configured to show other disruptions to the flights of the plurality of aircraft caused by the root cause flight disruption, wherein the disruption determination control unit indicates the other disruptions on the display via caused-disruption indicia, wherein the disruption determination control unit links the other disruptions to the root cause flight disruption, wherein the disruption determination control unit is configured to show a monetary impact indicator of the root cause flight disruption on the display, wherein the disruption determination control unit only shows the root cause flight disruption and other disruptions caused by the root cause flight disruption on the display without showing legs of flights that are not disrupted, and wherein the disruption determination control unit is configured to show schedule slack indicators on the display.

* * * * *